United States Patent [19]

Watanabe

[11] Patent Number: 5,678,312
[45] Date of Patent: Oct. 21, 1997

[54] ELECTRIC SHAVER WITH REDUCED VIBRATION

[75] Inventor: Makoto Watanabe, Sumoto, Japan

[73] Assignee: Sanyo Electric Co., Ltd., Moriguchi, Japan

[21] Appl. No.: 539,108

[22] Filed: Oct. 4, 1995

[30] Foreign Application Priority Data

Oct. 31, 1994 [JP] Japan .................................. 6-266642
Oct. 31, 1994 [JP] Japan .................................. 6-266643

[51] Int. Cl.⁶ .......................... B26B 19/02; B26B 19/04
[52] U.S. Cl. .................................. 30/213.92; 30/45
[58] Field of Search ....................... 30/43.92, 43.9, 30/44, 45, 43, 43.91, 346.51

[56] References Cited

U.S. PATENT DOCUMENTS

| 3,872,587 | 3/1975 | Wellinger | 30/43.92 |
| 5,046,249 | 9/1991 | Kawara et al. | 30/44 X |

FOREIGN PATENT DOCUMENTS

| 1 553 774 | 7/1966 | Germany . |
| 15 53 804 | 1/1977 | Germany . |
| 31 19 018 | 5/1982 | Germany . |
| 33 15 642 | 6/1984 | Germany . |
| 36 31 120 | 4/1987 | Germany . |
| 53-55271 | 5/1978 | Japan . |
| 55-30665 | 2/1980 | Japan . |

*Primary Examiner*—Douglas D. Watts
*Attorney, Agent, or Firm*—Wenderoth, Lind & Ponack

[57] ABSTRACT

An electric shaver according to the present invention is provided with an inner blade vibrating table connected to a motor for vibrating inner blades, and a balance weight capable of being vibrated in the direction parallel with the direction of vibration of the inner blade vibrating table. The balance weight is connected to the motor through a reverse vibrating mechanism which is vibrated in the direction reverse to the direction of vibration of the inner blade vibrating table. The motor vibrates, through the vibrating mechanism and the reverse vibrating mechanism, the inner blade vibrating table and the balance weight in the reverse directions with respect to each other, and thereby the vibration of the electric shaver can be reduced by the balance weight.

14 Claims, 12 Drawing Sheets

5,678,312

ELECTRIC SHAVER WITH REDUCED VIBRATION

BACKGROUND OF THE INVENTION

The present invention relates to an improved electric shaver, and especially to an electric shaver in which vibration of a casing thereof can be reduced.

An electric shaver in which inner blades are reciprocated by a motor has such a disadvantage that vibration of a casing thereof is caused by a reaction against the reciprocating movement of the inner blades. In order to reduce such vibration of a casing of an electric shaver provided with two inner blades, the two inner blades are vibrated in opposite directions with respect to one another. By vibrating the inner blades in the opposite directions, vibration of one inner blade can be offset by that of the other. Therefore an electric shaver having such a structure has an advantage that vibration of a casing thereof is reduced.

However, in an electric shaver in which two closely located inner blades are vibrated in the opposite directions, it is necessary that inner blade vibrating tables for reciprocating the two inner blades and drive mechanisms for driving the blade vibrating tables are separately provided and separately connected to motors. Consequently, such an electric shaver with complicated drive mechanisms has a disadvantage that costly parts are required to manufacture the same.

Further, an electric shaver in which two inner blades are reciprocated in the opposite directions has another disadvantage that when a trimmer blade is connected to one of the inner blade vibrating tables, the structure of the electric shaver is unbalanced and vibration of the casing increases.

Further, an electric shaver in which three inner blades are reciprocated has been developed. However, in such an electric shaver with three inner blades, it is difficult to reciprocate the inner blades in the opposite directions so as to balance vibrations of the inner blades. Furthermore, in an electric shaver in which only one inner blade is reciprocated, vibration of the inner blade cannot be offset and therefore vibration of a casing thereof increases, too.

The present invention has been developed in order to eliminate the above-mentioned disadvantages of the conventional electric shaver.

An important object of the present invention is to provide an electric shaver in which a drive mechanism for inner blades is simplified and thereby vibration of the electric shaver can be reduced.

Another important object of the present invention is to provide an electric shaver in which when the electric shaver is provided with three inner blades or with only one blade, vibration of the electric shaver can be also reduced.

A further important object of the present invention is to provide an electric shaver in which when a trimmer blade is reciprocated together with inner blades, vibration of the electric shaver can be also reduced.

SUMMARY OF THE INVENTION

An electric shaver according to the present invention contains in a casing thereof, a motor, a vibrating mechanism for converting the rotational movement of the motor to a reciprocating movement, and an inner blade vibrating table which is connected through the vibrating mechanism to the motor. Inner blades are connected to the inner blade vibrating table so that the inner blades are reciprocated by means of the motor.

Further, an electric shaver according to the present invention contains in the casing thereof, a balance weight which can vibrate in parallel with the direction of the vibrating movement of the inner blade vibrating table. The balance weight is connected, through a reverse vibrating mechanism which is vibrated in a direction as opposed to the vibrating movement of the inner blade vibrating table, to the motor. The motor vibrates the inner blade vibrating table by means of the vibrating mechanism, and also vibrates the balance weight by means of the reverse vibrating mechanism. By means of the vibrating mechanism and the reverse vibrating mechanism, the balance weight is vibrated in the direction reverse to the direction of the vibration of the inner blade vibrating table. The balance weight vibrated in the direction reverse to that of the vibration of the inner blade vibrating table reciprocates in such a direction as to offset the vibration of the inner blade vibrating table, and thereby can reduce the vibration of the casing.

BRIEF DESCRIPTION OF THE DRAWINGS

The above and further objects and features of the invention will more fully be apparent from the following detailed description with accompanying drawings, in which.

DETAILED DESCRIPTION OF THE INVENTION

Figure 5:
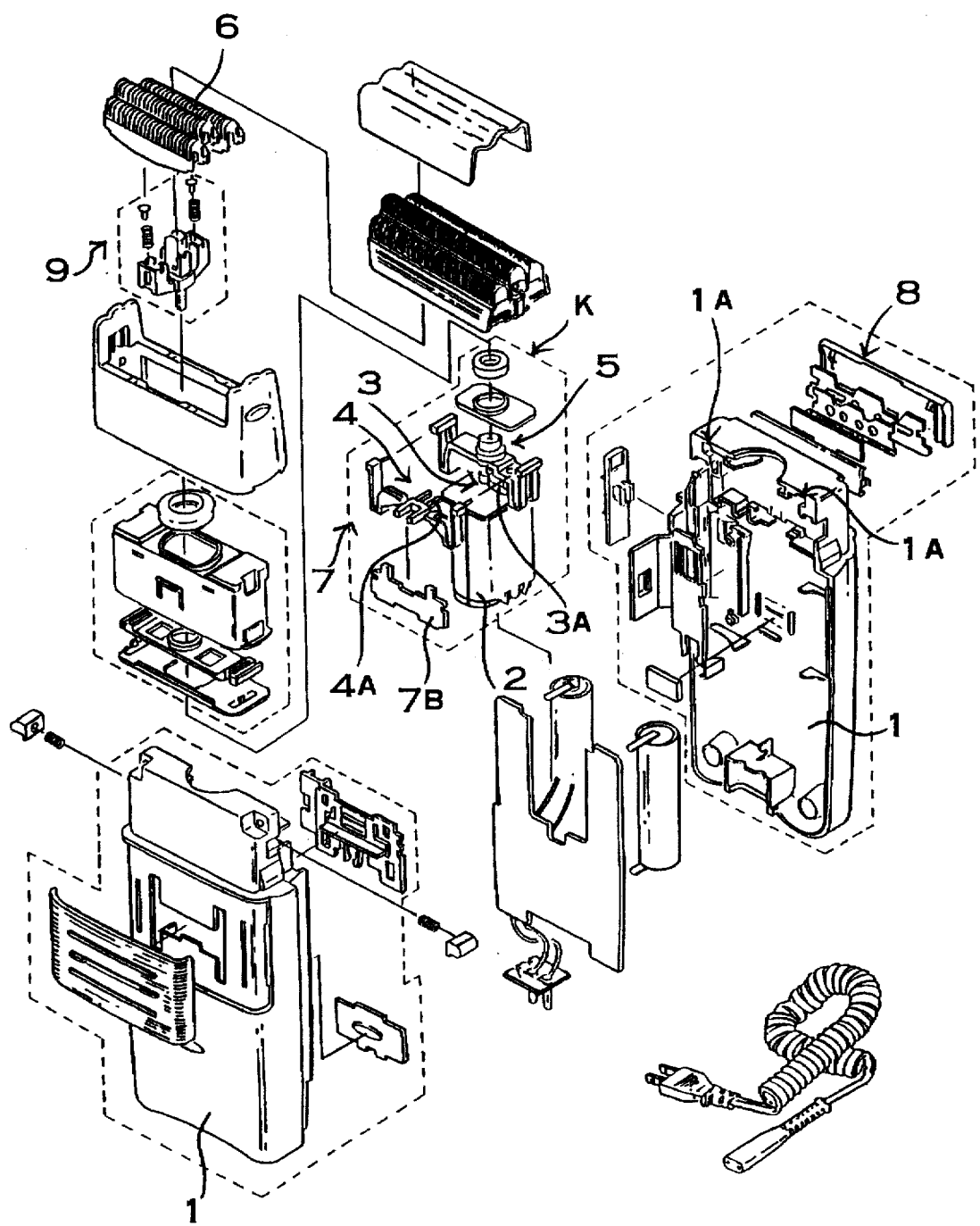
FIG. 5 is an exploded perspective view of the electric shaver of FIG. 1.

An electric shaver shown in FIGS. 1 to 5 comprises a casing 1, a motor 2 contained in the casing 1, a battery for rotating the motor 2, a vibrating mechanism 3 which converts the rotational movement of the motor 2 to a reciprocating movement and vibrates an inner blade vibrating table 5, a balance weight 7 which is vibrated in a direction reverse to that of the vibration of the inner blade vibrating table 5, a reverse vibration mechanism 4 which reciprocates the balance weight 7, an inner blade block 9 provided with three inner blades 6 connected to the inner blade table 5, an outer blade, the inner blades 6 of the inner blade assembly being adapted to slide on the inner face of the outer blade, and a trimmer blade 8 connected to the balance weight 7 and adapted to be reciprocated together with the balance weight 7. In FIG. 5, only the part enclosed with a chain line and designated by K is shown with right and left reversed for illustrating the structure of the balance weight 7. And FIG. 6 is an enlarged perspective view of the part K shown in FIG. 5.

Figure 6:
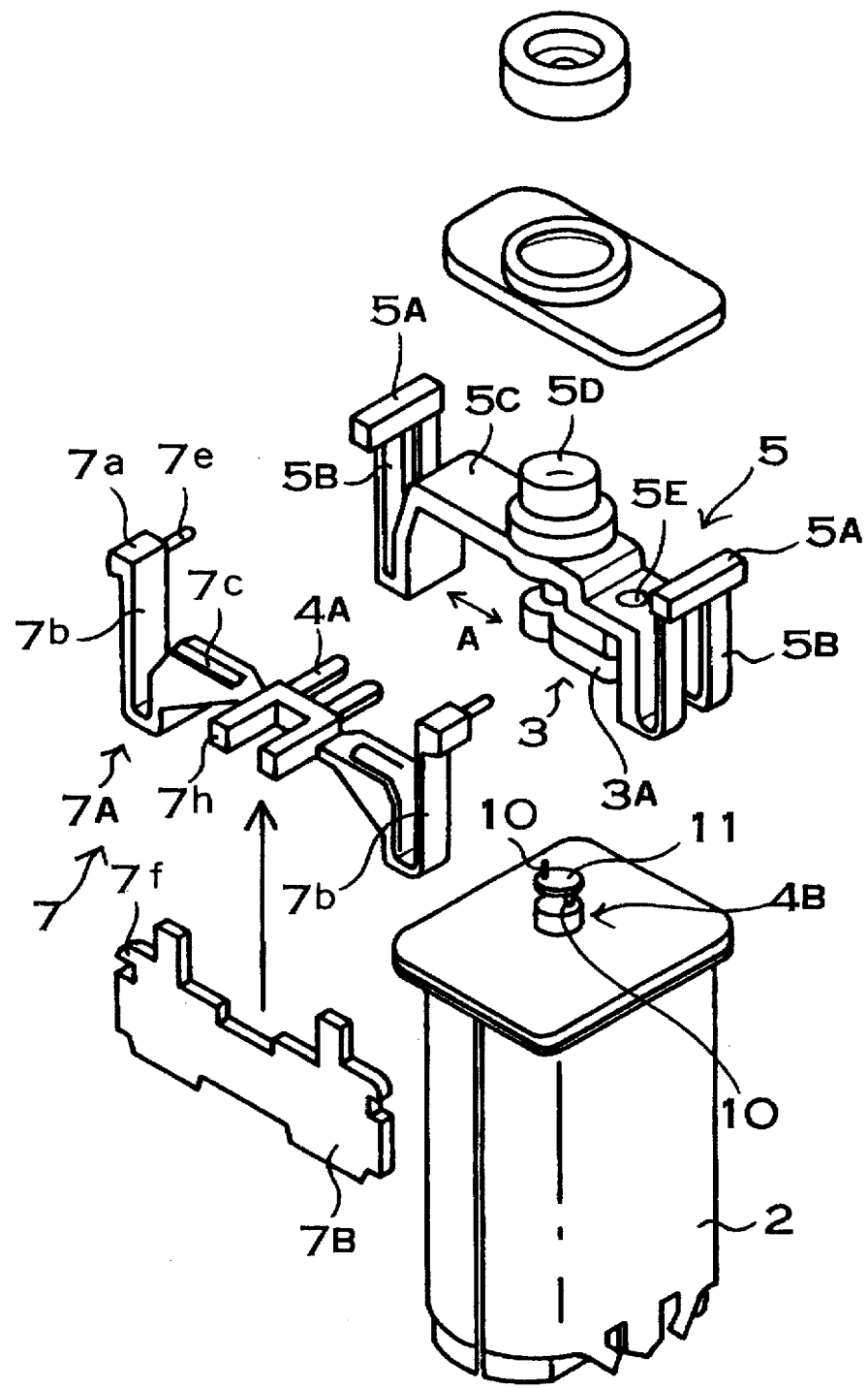
FIG. 6 is a perspective view of parts of the electric shaver illustrating a vibrating mechanism and a reverse vibrating mechanism for reciprocating an inner blade vibrating table and a balance weight.

FIG. 6 illustrates the parts of the vibrating mechanism 3 and the reverse vibrating mechanism 4 for vibrating the inner blade vibrating table 5 and the balance weight 7 in the reverse directions.

Referring to FIG. 6, when the motor 2 rotates the cam shaft 4B, the vibrating mechanism 3 and the reverse vibrating mechanism 4 reciprocate the inner blade vibrating table 5 and the balance weight 7 in the reverse directions through two eccentric shafts 10 the phases of which are shifted by an angle of 180 degrees with respect to each other. Since the inner blade block 9 to which three inner blades 6 are attached is connected to the inner blade vibrating table 5, the balance weight 7 is reciprocated in the direction reverse to the direction of the reciprocating movement of the inner blades 6.

The inner blade vibrating table 5 shown in FIG. 6 is manufactured of plastic material. The inner blade vibrating table 5 is provided at both of its ends with fixing portions 5A to be fixed on the casing 1. The fixing portions 5A are connected, through resiliently deformable portions 5B molded in U-shapes, to a main portion 5C. The main portion 5C is provided at its center with a connecting portion 5D for connecting the inner blade block 9. Further, the main portion 5C is provided with a rotation hole 5E for rotatively connecting a connecting rod 3A which is the vibrating mechanism.

Each of the fixing portions 5A is in the shape of a prism and is inserted into each of square holes 1A provided in the casing and fixed. Each of the resiliently deformable portions 5B is molded in the shape of a thin plate so as to be easily deformable. The resiliently deformable portions 5B fix the fixing portions 5A to the casing 1, and in the deformed state, they support the main portion 5C so as to be vibrated. The inner blade vibrating table 5 shown in FIG. 6 is vibrated in the direction illustrated by the arrow A through the deformation of the resilient deformable portions 5B.

The balance weight 7 is provided adjacent to the inner blade vibrating table 5 and is vibrated in the direction reverse to that of the vibration of the inner blade vibrating table 5. The balance weight 7 shown in FIG. 6 comprises a supporting member 7A manufactured of plastic material and a weight part 7B fixed to the supporting member 7A. Though not shown, the whole of the balance weight 7 may naturally be molded of resiliently deformed plastic material or formed of metal material.

Figure 7:
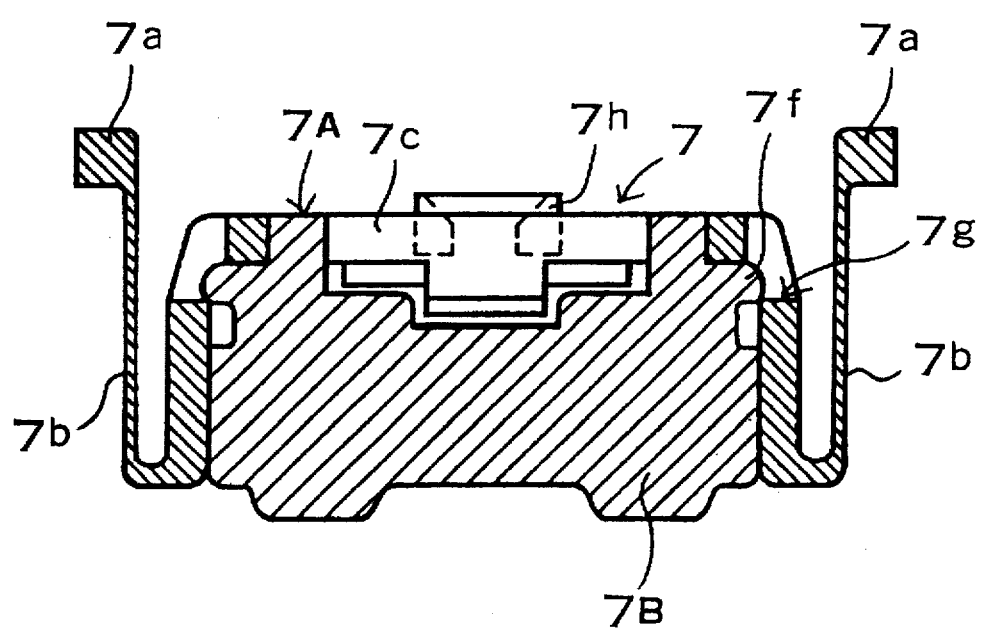
FIG. 7 is a partly sectioned back view of the balance weight.
Figure 9:
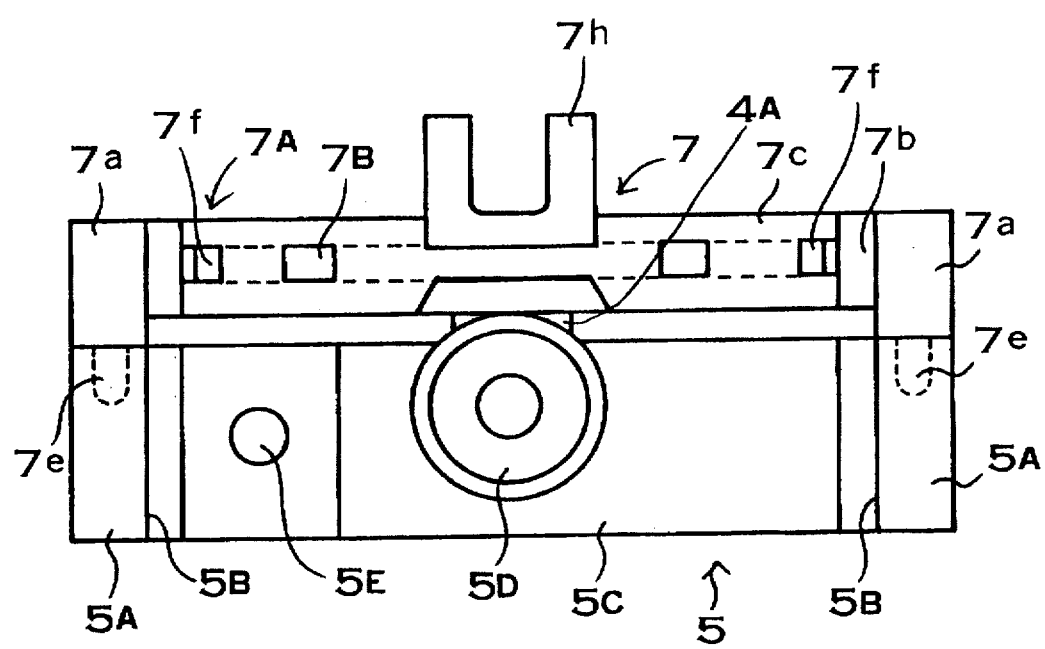
FIG. 9 shows a plan view illustrating the connection between an inner blade vibrating table and the balance weight.

As shown in FIG. 7, the supporting member 7A is provided at both ends thereof with fixing portions 7a, and is molded in such a shape that the fixing portions 7a are connected through U-shaped resiliently deformable portions 7b to a main portion 7c. As shown in FIG. 6, each of the fixing portions 7a of the supporting member 7A has a projection 7e. A recess is provided in each of the fixing portions 5A of the inner blade vibrating table 5 so that one of the projections 7e is fitted into each of the recesses. By fitting the projections 7e into the recesses of the fixing portions 5A, the fixing portions 5A of the inner blade vibrating table 5 and the fixing portions 7a of the supporting member 7A are linearly connected. The linearly connected fixing portions 5A, 7a of the inner blade vibrating table 5 and the supporting member 7A are fitted into the square holes 1A, and fixed. The fixing portions 5A, 7a of the inner blade vibrating table 5 and the supporting member 7 are molded to have the same outer shape. Further, the resiliently deformable portions 7b, 5B of the supporting member 7A and the inner blade vibrating table 5 are molded in the same shape. As shown in the plan view of FIG. 9, the fixing portions 5A of the inner blade vibrating table 5 and the fixing portions 7a of the supporting member 7A are connected with each other through the projections 7e in such a manner that when they are connected, some spaces are provided between the main portions 7c, 5C and the resiliently deformable portions 7b, 5B, and thereby the inner blade vibrating table 5 and the balance weight 7 can be vibrated in the reverse directions without contacting with each other.

The main portion 7c of the supporting member 7A is provided on one side face with an integratedly molded connecting projection 4A. The connecting projection 4A has such a width as to be in connection with the cam shaft 4 so as to constitute the reverse vibrating mechanism 4B. Further, the main portion 7c is molded to define a downwardly opened fitting recess so that the weight part 7B can be fitted into the fitting recess and thereby be connected with the main portion 7c. The fitting recess is molded to have an inner shape substantially the same as the outer shape of the weight part 7B. Further, as shown in FIG. 7, two engagement portions 7g are integrally molded with the fitting recess. Two engagement projections 7f provided on both sides of the upper end of the weight part 7B are engaged with the engagement portions 7g. When the engagement projections 7f are engaged with the engagement portions 7g, the weight part 7B is prevented from being detached from the supporting member 7A even if the main portion 7c of the supporting member 7A is vibrated. The weight of the weight part 7B is so selected as to reduce the vibration of the same and to provide the same with sufficient durability, while taking into consideration the weight of the member with which the inner blades are vibrated and the weight of the trimmer blade 8.

Figure 1:
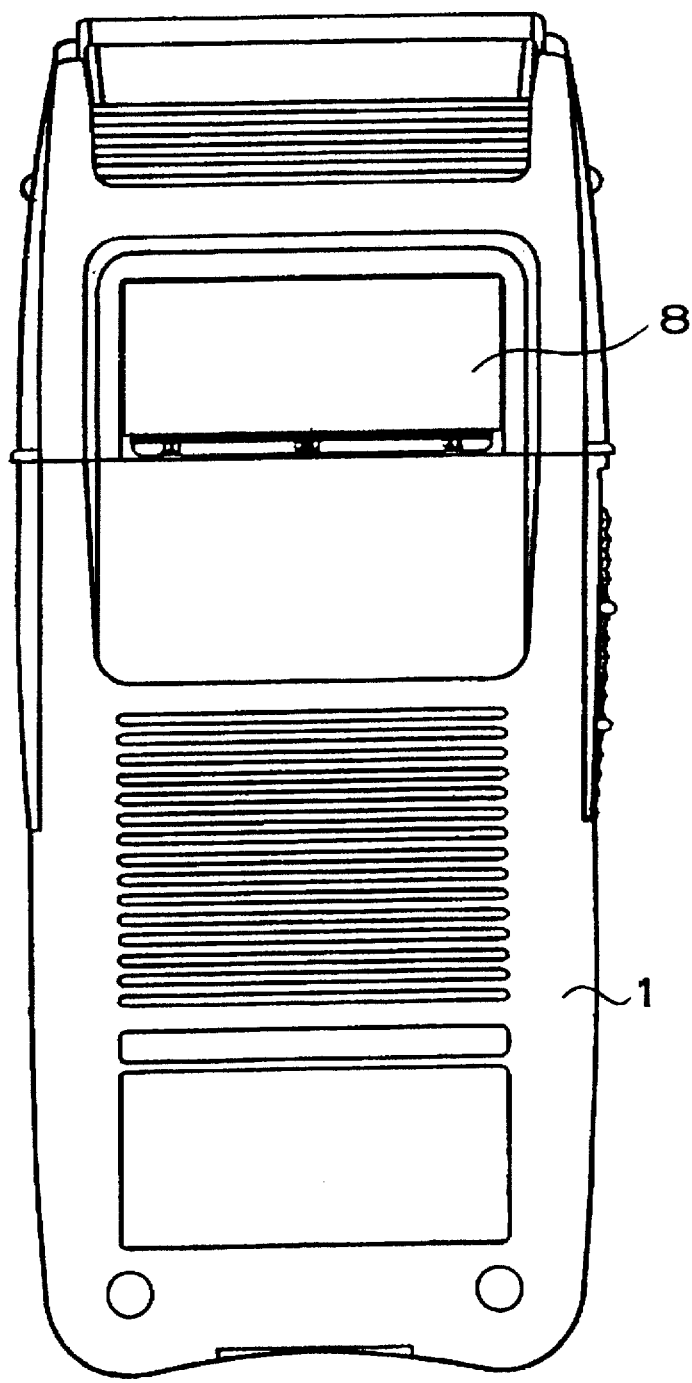
FIG. 1 is a front view of an embodiment of an electric shaver according to the present invention.
Figure 2:
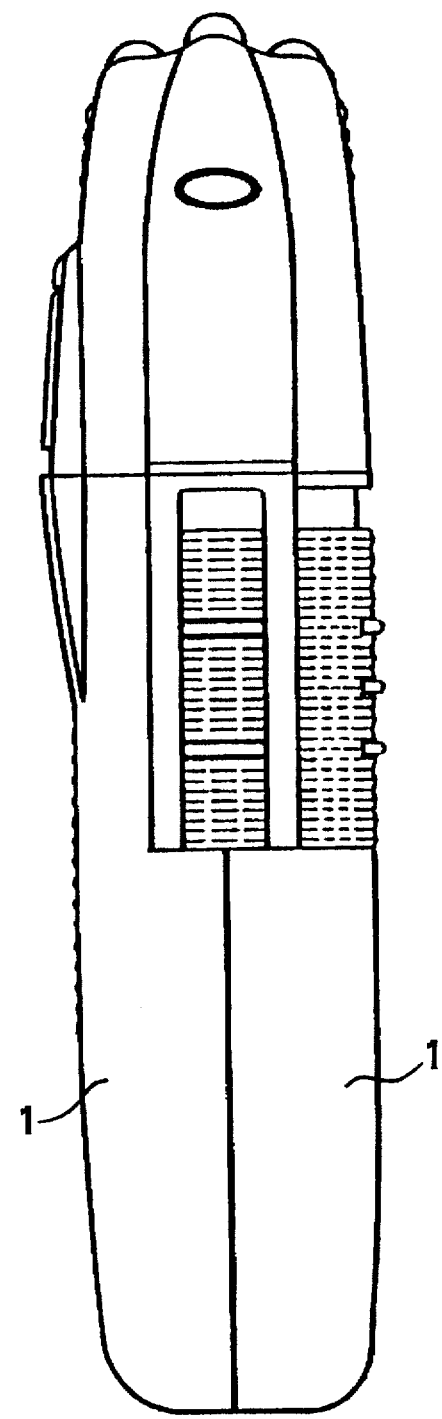
FIG. 2 is a side view of the electric shaver of FIG. 1.
Figure 3:
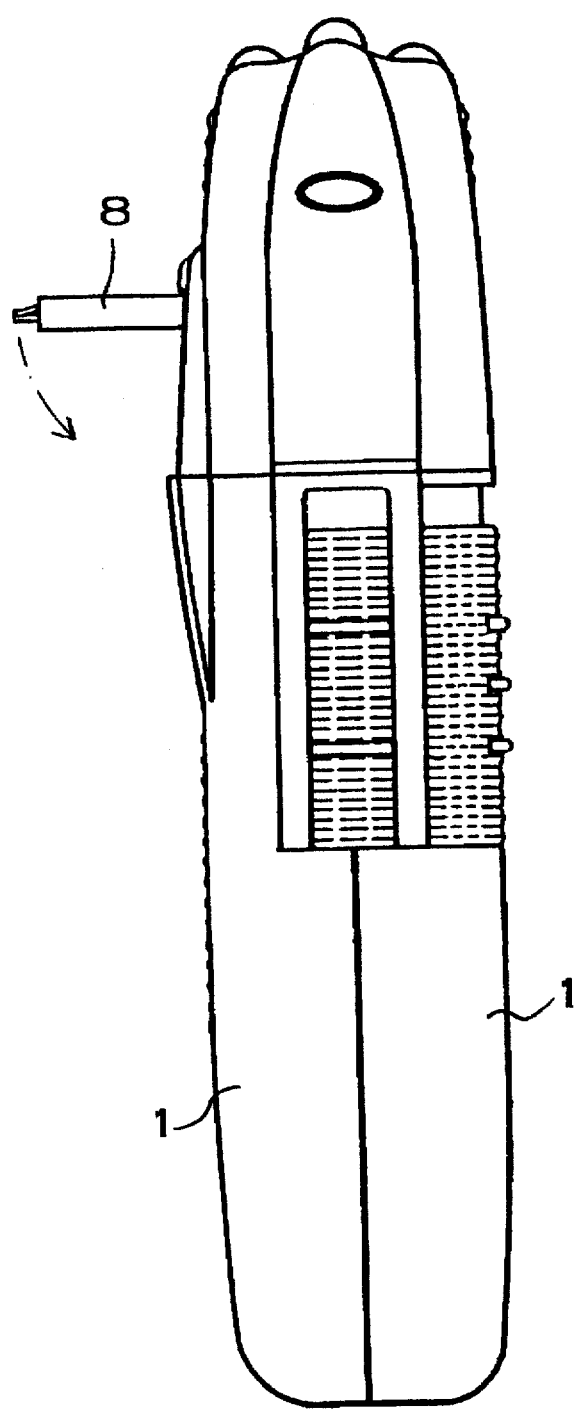
FIG. 3 is a side view of the electric shaver of FIG. 1 in which a trimmer blade is in the erected position.
Figure 4:
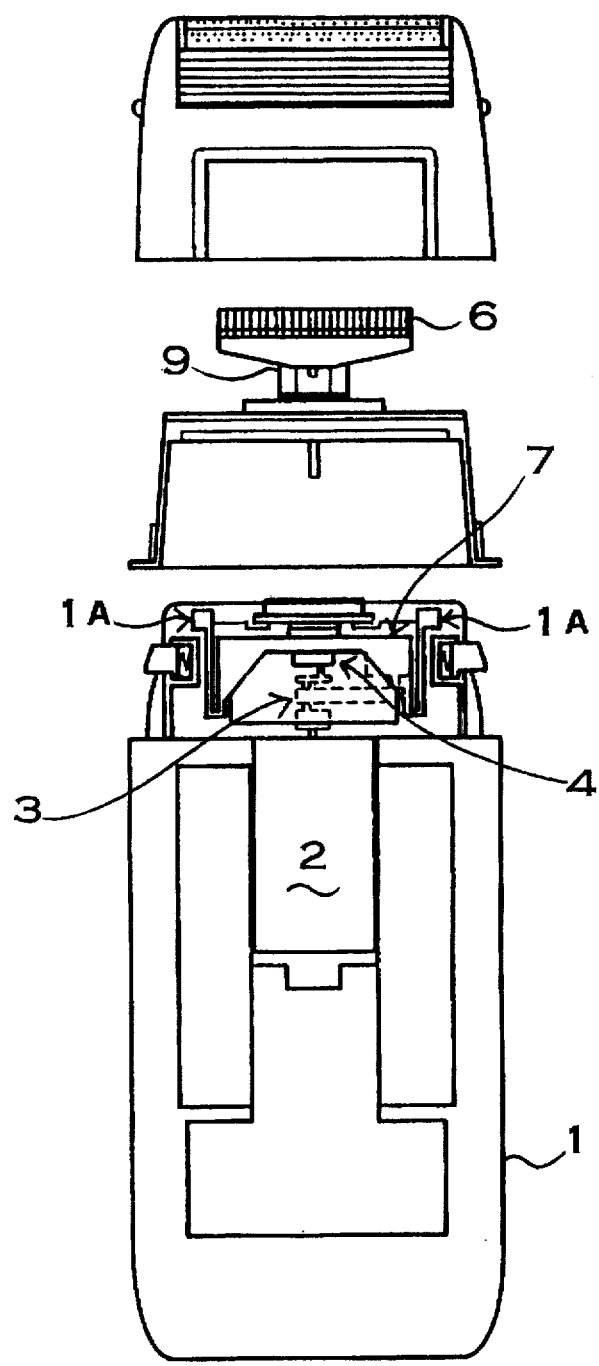
FIG. 4 is a front view illustrating the inner structure of the electric shaver of FIG. 1.
Figure 8:
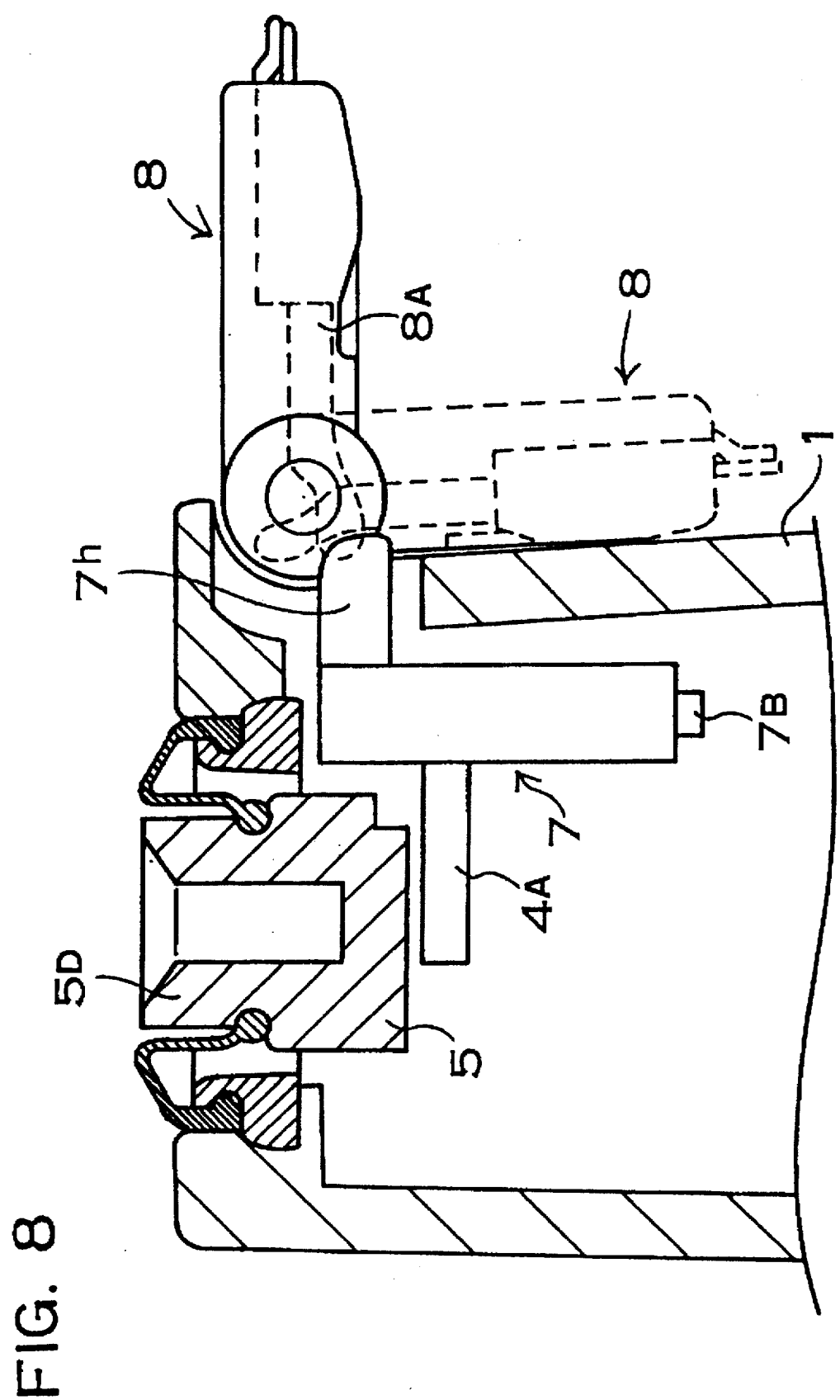
FIG. 8 is a side view illustrating an arm of the trimmer blade being connected to a part of the balance weight when the trimmer blade is erected.

Further, the supporting member 7A of the balance weight 7 is provided, on the side opposite to the connecting projection 4A, with drive projection 7h for driving the trimmer blade 8. As shown with full line in FIG. 8, with the trimmer blade 8 being erected perpendicularly to the casing 1, an arm 8A of the reciprocating trimmer blade 8 is fitted into a slit provided in the drive projection 7h and connected therewith. When the trimmer blade 8 is put back to the position in parallel with the casing 1 as shown in FIG. 2, the arm 8A of the trimmer blade 8 is detached from the drive projection 7h of the supporting member 7A as shown with chain line in FIG. 8. The slit provided in the drive projection 7h has such a width that the arm 8A of the trimmer blade 8 can be fitted thereinto. The end of the arm 8A of the trimmer blade 8 can be fitted into or detached from the slit provided in the drive projection 7h by pivoting the trimmer blade 8 through an angle of 180 degrees, because the end of the arm 8A is off the center of the rotation shaft for pivotally moving the trimmer blade 8.

The vibrating mechanism 3 which reciprocates the inner blade vibrating table 5 by means of the rotational movement of the motor 2 comprises a cam shaft 4B fixed to the rotation shaft, and a connecting rod 3A. The cam shaft 4B is provided with two eccentric shafts 10 in diametrically opposite positions off the center of the rotation shaft. The two eccentric shafts 10 are connected to each other through an intermediate disk 11. The eccentric shaft 10 on the motor side is connected through the connecting rod 3A to the inner blade vibrating table 5. One end of the connecting rod 3A is pivotally connected to the eccentric shaft 10. The other end portion of the connecting rod 3A is provided with an upwardly projected connecting shaft member. With the connecting shaft member rotatively penetrating through the rotation hole 5E provided in the main portion 5C of the inner blade vibrating table 5, the connecting rod 3A is connected to the inner blade vibrating table 5. An E-ring is fixed to the upper end portion of the connecting shaft member in order to preventing the same from slipping out.

The reverse vibrating mechanism 4 comprises the cam shaft 4B and the connecting projection 4A provided on the supporting member 7A. The connecting projection 4A of the balance weight 7 is connected to the upper eccentric shaft 10, so that the balance weight 7 can be reciprocated in the direction reverse to that of the reciprocating movement of the inner blade vibrating table 5. The width of a slit provided in the connecting projection 4 is so designed as to be substantially equal to the diameter of the eccentric shaft 10.

An electric shaver having the above-mentioned structure is advantageous in that the drive mechanism for the inner blades can be simplified and the vibration of the electric shaver can be reduced. This is because in such an electric shaver, the balance weight is vibrated in the direction reverse to that of the vibration of the inner blades, and thereby the vibrations of the inner blades and the balance weight are offset with respect to each other. Since the balance weight for offsetting the vibration has a simple structure, unlike the inner blade assembly which has a complicated structure composed of a number of parts. A conventional electric shaver, in which the vibration of the electric shaver is offset by vibrating two inner blades in the reverse directions, requires a complicated drive mechanism for reciprocating two inner blades separately from each other. However, in an electric shaver according to the present invention, a drive mechanism used only for reciprocating two or three inner blades together can be simplified, and the vibration of the electric shaver can be reduced by means of a balance weight.

Further, an electric shaver according to the present invention is advantageous, because the vibration can be reduced if the electric shaver is provided with not only two but one or three inner blades. In a conventional electric shaver in which inner blades are vibrated in the reverse directions, the vibrations of the inner blades can be offset only when two inner blades are provided. When a conventional electric shaver is provided with three inner blades, the vibration can be reduced by shifting the phases of vibrating the three inner blades by an angle of 120 degrees with one another, but the three inner blades are required to be separately vibrated for realizing this, and a drive mechanism becomes very complicated. On the contrary, an electric shaver according to the present invention is advantageous, because the vibrations of inner blades are offset not by the inner blades themselves but by a balance weight, and a drive mechanism can be simplified and the vibration of the electric shaver can be reduced independent of the number of the provided inner blades.

Furthermore, an electric shaver according to the present invention is advantageous, because even when a trimmer blade is reciprocated together with the inner blades, the vibration of the electric shaver can be reduced. An electric shaver according to the present invention is advantageous especially because the vibration of the electric shaver can be further reduced by vibrating the trimmer blade in the direction reverse to that of the vibration of the inner blades.

Figure 10:
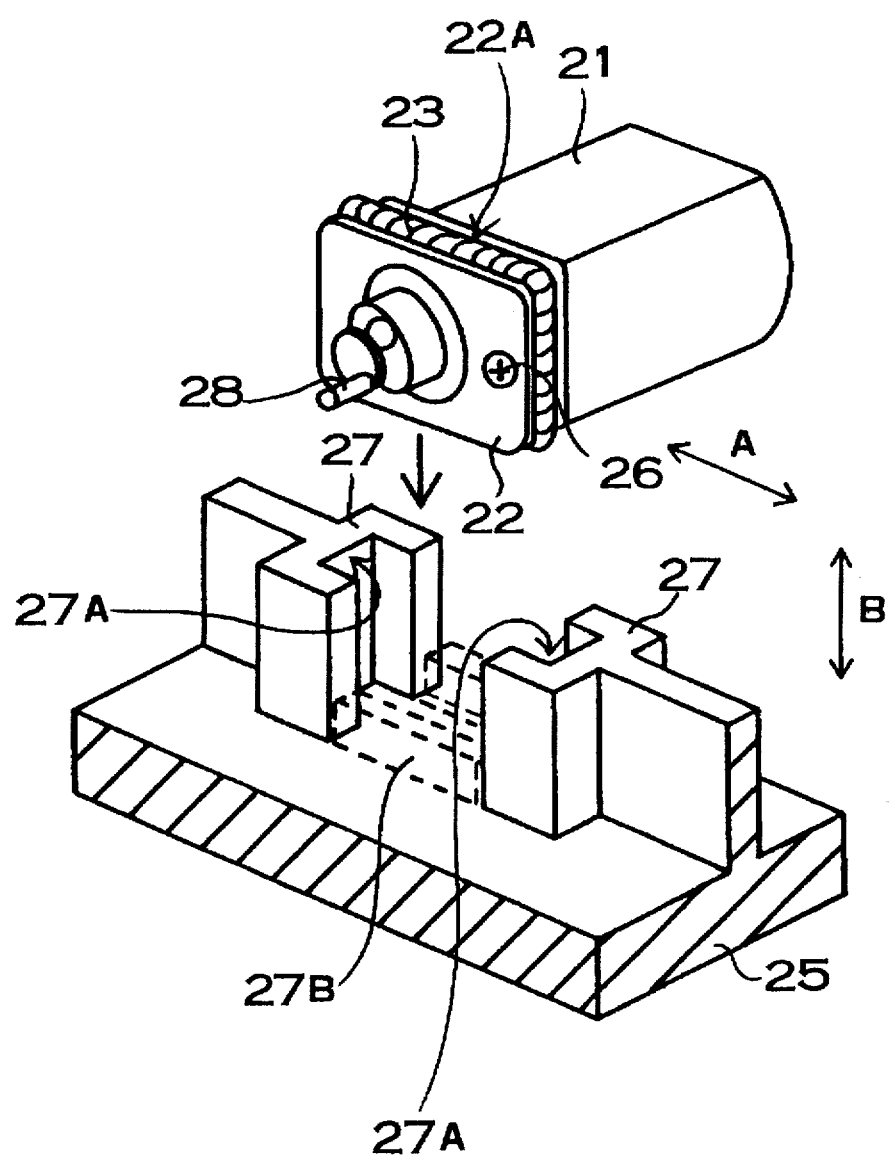
FIG. 10 is a perspective view illustrating a motor attached to a casing of the electric shaver.
Figure 12:
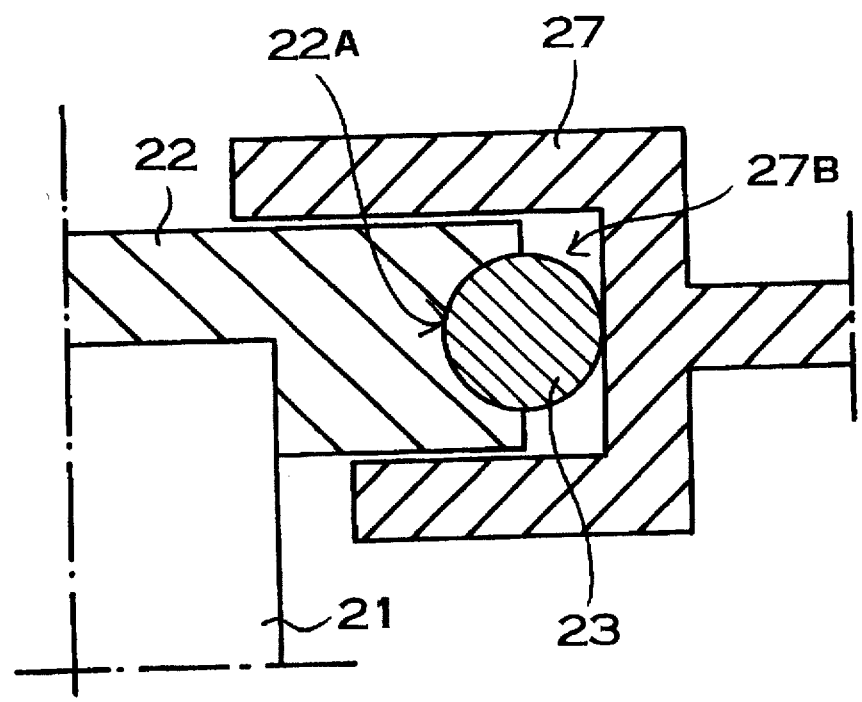
FIG. 12 is an enlarged sectional view of an O-ring section of FIG. 12.

In an electric shaver according to the present invention, a motor can be fixed to a casing in such a manner as shown in FIGS. 10 and 12, and thereby the vibration of the electric shaver can be reduced. FIGS. 10 and 12 show the parts for fitting the motor 21 to the casing 25. A connecting member 22 is screwed on the front surface of the motor 21. The connecting member 22 is a rigid plastic plate and is molded in a rectangular shape somewhat larger than the outline of the motor 21. The connecting member 22 is fixed through two screws 26 to the front surface of the motor 21. Further, in the outer circumferential surface of the connecting member 22, a channel-shaped fitting portion 22A is molded, into which an O-ring 23 used as an antivibration rubber member is fitted. With the channel-shaped fitting portion 22A molded about the whole outer circumferential surface of the connecting member 22, the O-ring fitted to the connecting member 22 can be most surely prevented from slipping off the connecting member 22. However, channel-shaped fitting portions 22A may be molded in the opposite side surfaces or in a part of each of four side surfaces of the connecting member 22. Further, since the fitting portion 22A is provided for fitting an O-ring in a given position, it is not always necessary to mold the fitting portion 22A in a channel shape. For example, though not shown, a fitting portion 22A may comprise a pair of projections, molded at opposed positions, between which an O-ring is fitted. The space between the two opposed projections is so designed that the O-ring can be fitted into the space. A plural number of such pairs of projections are provided with a predetermined space therebetween throughout the outer circumferential surface of the connecting member 22, and the O-ring can be attached to the outer circumferential surface of the connecting member 22.

The connecting member 22 with an O-ring attached to the outer circumferential surface thereof is attached to connecting walls integrally molded with the casing 25. In the casing 25 shown in FIG. 10, a pair of opposed connecting walls 27 are molded integrally with the casing 25 so as to be vertical to the bottom face of the casing, and recesses 27A into which the connecting member 22 can be fitted are provided in the opposed wall portions of the connecting walls 27. The bottom face of the recess 27A is formed to be flat. The flat bottom face of the recess 27A is contacted by the O-ring. In this contacting state, the vibration of the motor 21 can be ideally absorbed, and the O-ring used as an antivibration rubber member 23 is deformed and thereby connects the connecting member 22 and the connecting walls 27 to each other in the pushed state without shaking. It is because, as shown in FIG. 12, the antivibration rubber member 23 comprising an O-ring partially pushed against the bottom face of the recess provided in the connecting wall 27 is easily deformed when the amount of deformation is small, and as the amount of deformation increases, the amount of deformation becomes smaller with respect to the pushing force, and the anti-pushing force increases.

Figure 11:
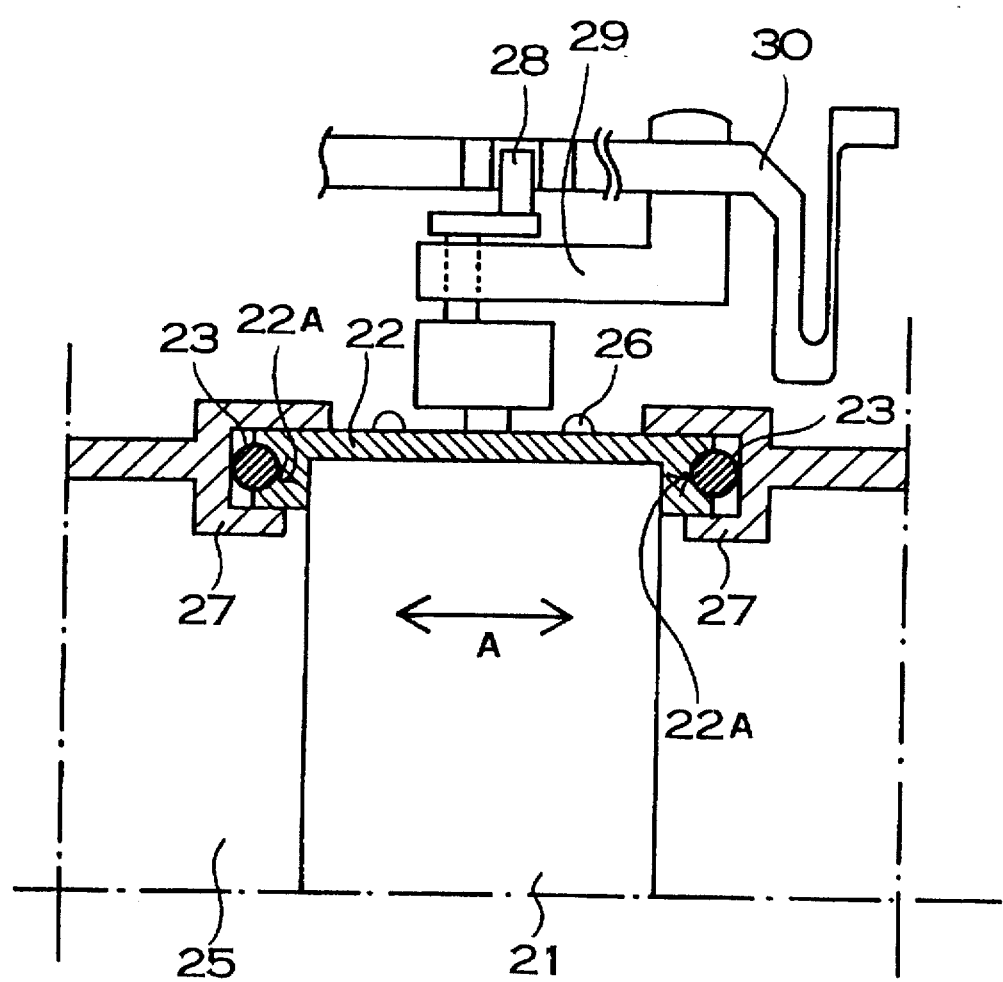
FIG. 11 is a horizontal sectional view of the motor attached to the casing of FIG. 10.

As shown in FIG. 11, the O-ring used as an antivibration rubber member 23 is put between the connecting member 22 and the casing 25. Then, connecting member 22 is connected through the O-ring used as an antivibration rubber member 23 to the casing 25. With this structure, when the motor 21 is vibrated and thereby the connecting member 22 is vibrated, the vibration of the connecting member 22 is absorbed by the O-ring and the vibration of the casing 25 can be reduced. The O-ring is a rubber-like resilient member, and it is deformed and absorbs the vibration energy of the motor 21.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalents of such meets and bounds thereof are therefore intended to be embraced by the claims.

What is claimed is:

1. An electric shaver with reduced vibration comprising:
   a casing;
   a motor contained in the casing;
   a vibrating mechanism contained in the casing for converting a rotational movement of the motor to a reciprocating movement;
   an inner blade vibrating table connected through the vibrating mechanism to the motor and being reciprocably movable in first and second opposite directions;
   inner blades operably coupled to the inner blade vibrating table;
   a balance weight positioned in the casing and reciprocably movable in the first and second opposite directions;
   a reverse vibrating mechanism contained in the casing for vibrating the balance weight in directions reverse to directions of vibration of the inner blade vibrating table; and
   wherein the casing includes a pair of square holes, and each of the fixing portions of the inner blade vibrating table is in the shape of a prism which is inserted into one of the square holes provided in the casing.

2. An electric shaver with reduced vibration as claimed in claim 1, in which the vibrating mechanism and the reverse vibrating mechanism are provided with a cam shaft, and the cam shaft is provided with two eccentric shafts, one for vibrating the inner blade vibrating table and the other for vibrating the balance weight, the phases of the two eccentric shafts being shifted from each other by an angle of 180 degrees.

3. An electric shaver with reduced vibration as claimed in claim 2, in which the vibrating mechanism is provided with a connecting rod for connecting one of the eccentric shafts of the cam shaft to the inner blade vibrating table.

4. An electric shaver with reduced vibration as claimed in claim 3, in which the inner blade vibrating table is provided with a rotation hole to which the connecting rod of the vibrating mechanism is connected.

5. An electric shaver with reduced vibration comprising:
   a casing;
   a motor contained in the casing;
   a vibrating mechanism contained in the casing for converting a rotational movement of the motor to a reciprocating movement;
   an inner blade vibrating table connected through the vibrating mechanism to the motor and being reciprocably movable in first and second opposite directions;
   inner blades operably coupled to the inner blade vibrating table;
   a balance weight positioned in the casing and reciprocably movable in the first and second opposite directions;
   a reverse vibrating mechanism contained in the casing for vibrating the balance weight in directions reverse to directions of vibration of the inner blade vibrating table;
   wherein the balance weight comprises a supporting member formed of plastic material, and a weight part fixed to the supporting member;
   wherein the inner blade vibrating table includes fixing portions fixed to the casing;
   wherein the balance weight further includes fixing portions connected to the supporting member and having projections for connecting the fixing portions of the balance weight to the fixing portions of the inner blade vibrating table, and the inner blade vibrating table is provided at the fixing portions thereof with recesses for receiving the projections, respectively, so that by respectively fitting the projections into the recesses, the fixing portions of the balance weight and the fixing portions of the inner blade vibrating table are linearly connected together, respectively; and
   wherein the casing includes a pair of square holes, and the fixing portions of the supporting member of the balance weight and the fixing portions of the inner blade vibrating table are, while linearly connected together, fitted into the square holes provided in the casing and are thereby fixed to the casing.

6. An electric shaver with reduced vibration as claimed in claim 5, in which the reverse vibrating mechanism comprises a cam shaft having an eccentric shaft, and the supporting member of the balance weight is provided with a connecting projection which is connected to the eccentric shaft of the cam shaft of the reverse vibrating mechanism.

7. An electric shaver with reduced vibration comprising:
   a casing;
   a motor contained in the casing;
   a vibrating mechanism contained in the casing for converting a rotational movement of the motor to a reciprocating movement;
   an inner blade vibrating table connected through the vibrating mechanism to the motor and being reciprocably movable in first and second opposite directions;
   inner blades operably coupled to the inner blade vibrating table;
   a balance weight positioned in the casing and reciprocably movable in the first and second opposite directions;
   a reverse vibrating mechanism contained in the casing for vibrating the balance weight in directions reverse to directions of vibration of the inner blade vibrating table; and
   a trimmer blade connected to the balance weight, the balance weight and the trimmer blade being vibrated together.

8. An electric shaver with reduced vibration as claimed in claim 7, in which the supporting member of the balance weight is provided with a drive projection which is connected to the trimmer blade.

9. An electric shaver with reduced vibration as claimed in claim 8, in which the trimmer blade is attached to the casing so as to be movable between a folded position and an erected position, and the drive projection of the balance weight is connected to the trimmer blade when the trimmer blade is in the erected position.

10. An electric shaver with reduced vibration comprising:
    a casing;
    a motor contained in the casing;
    a vibrating mechanism contained in the casing for converting a rotational movement of the motor to a reciprocating movement;
    an inner blade vibrating table connected through the vibrating mechanism to the motor and being reciprocably movable in first and second opposite directions;
    inner blades operably coupled to the inner blade vibrating table;
    a balance weight positioned in the casing and reciprocably movable in the first and second opposite directions;

a reverse vibrating mechanism contained in the casing for vibrating the balance weight in directions reverse to directions of vibration of the inner blade vibrating table;

a connecting member connected to the motor and to the casing, such that the motor is connected through the connecting member to the casing;

an antivibration rubber member attached to the connecting member and to the casing, such that the connecting member is attached through the antivibration rubber member to the casing; and wherein the connecting member is provided in an outer circumferential surface thereof with a channel-shaped fitting portion, and the antivibration rubber member comprises an O-ring fitted to the fitting portion.

11. An electric shaver with reduced vibration comprising:

a casing;

a motor contained in the casing;

a vibrating mechanism contained in the casing for converting a rotational movement of the motor to a reciprocating movement;

an inner blade vibrating table connected through the vibrating mechanism to the motor and being reciprocably movable in first and second opposite directions;

inner blades operably coupled to the inner blade vibrating table;

a balance weight positioned in the casing and reciprocably movable in the first and second opposite directions;

a reverse vibrating mechanism contained in the casing for vibrating the balance weight in directions reverse to directions of vibration of the inner blade vibrating table;

wherein the inner blade vibrating table comprises a main portion operably coupled to the inner blades, two resiliently deformable portions provided on opposing sides of the main portion, and two fixing portions connected through the resiliently deformable portions, respectively, to the main portion, the fixing portions being fixed to the casing;

wherein the balance weight is positioned adjacent to and in parallel with the inner blade vibrating table;

wherein the balance weight comprises a supporting member formed of plastic material, and a weight part fixed to the supporting member;

wherein the supporting member of the balance weight comprises a main portion, two U-shaped resiliently deformable portions connected to opposing sides of the main portion and two fixing portions connected through the resiliently deformable portions, respectively, to the main portion, the fixing portions being fixed to the casing; and wherein the fixing portions of the balance weight and the fixing portions of the inner blade vibrating table are linearly connected together, respectively.

12. An electric shaver with reduced vibration as claimed in claim 11, in which the vibrating mechanism and the reverse vibrating mechanism are provided with a cam shaft, and the cam shaft is provided with two eccentric shafts, one for vibrating the inner blade vibrating table and the other for vibrating the balance weight, the phases of the two eccentric shafts being shifted from each other by an angle of 180 degrees.

13. An electric shaver with reduced vibration as claimed in claim 12, in which the vibrating mechanism is provided with a connecting rod for connecting one of the eccentric shafts of the cam shaft to the inner blade vibrating table.

14. An electric shaver with reduced vibration as claimed in claim 13, in which the inner blade vibrating table is provided with a rotation hole to which the connecting rod of the vibrating mechanism is connected.

* * * * *